June 4, 1957  T. TABAC  2,794,309
RAKE ATTACHMENT FOR LAWN MOWERS
Filed March 28, 1955  2 Sheets-Sheet 1

Tony Tabac INVENTOR.

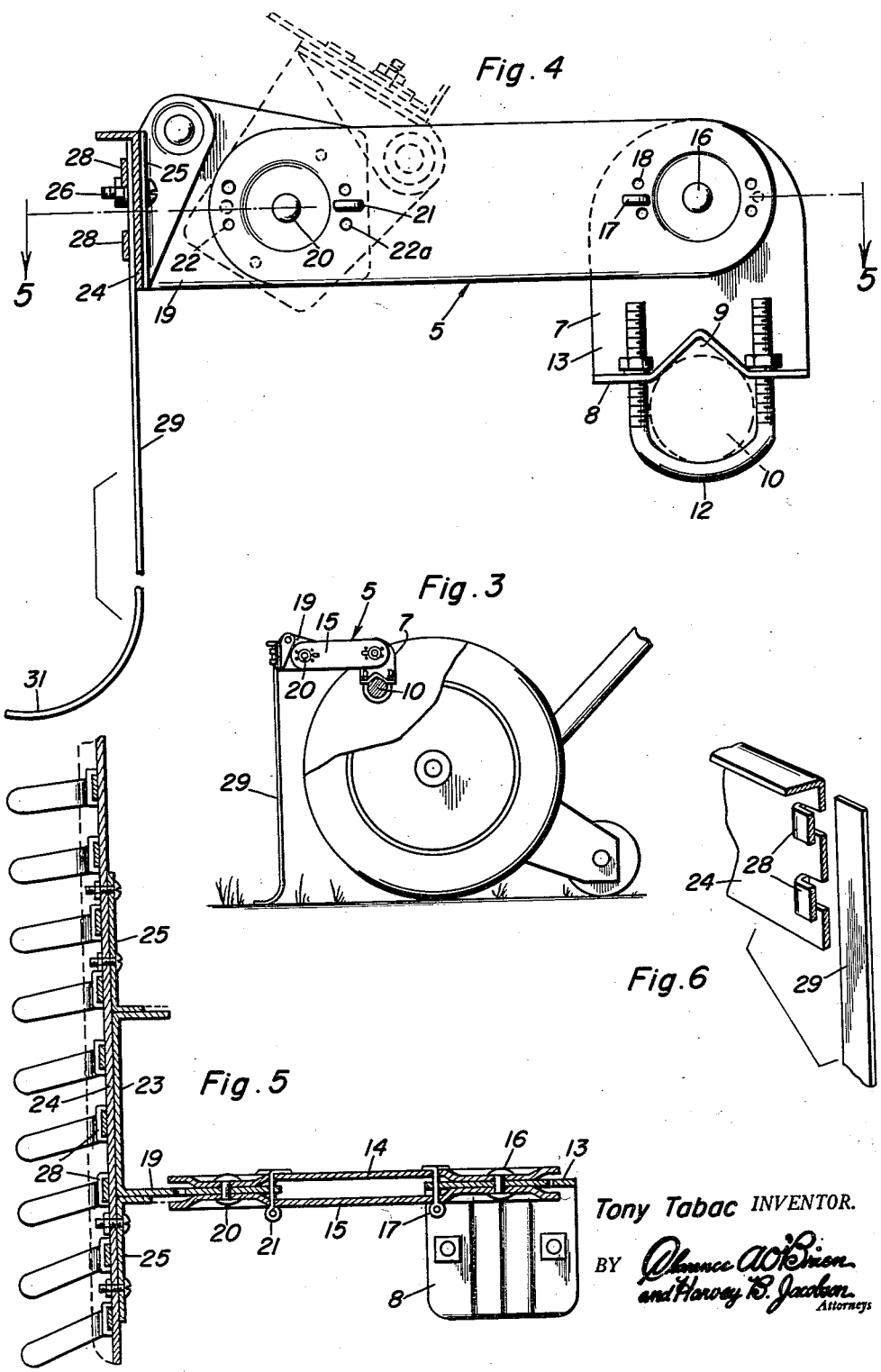

United States Patent Office 2,794,309
Patented June 4, 1957

2,794,309

RAKE ATTACHMENT FOR LAWN MOWERS

Tony Tabac, Dearborn, Mich.

Application March 28, 1955, Serial No. 496,991

2 Claims. (Cl. 56—249)

The present invention relates to new and useful improvements in rake attachments for lawn mowers, either hand or power operated, to clear sticks or trash in advance of the rotary blades, as well as to comb and lift crab grass, vines or flattened grass for more effectively cutting by the mower.

An important object of the invention is to provide a front rake attachment for lawn mowers which may be easily and quickly attached thereto without necessitating changes or alterations in the construction of the mower and embodying a swingable connection for the rake to lift the same out of operating position, when desired.

Another object is to provide attaching brackets for the rake embodying vertical adjusting means for the tines or for adjusting the angle of the tines relative to the mower.

A further object is to provide a device of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a side elevational view;

Figure 4 is an enlarged side elevational view of one of the attaching and tine adjusting brackets;

Figure 5 is a sectional view taken on a line 5—5 of Figure 4; and

Figure 6 is an enlarged fragmentary group perspective view of the tine attaching construction.

Figure 1:
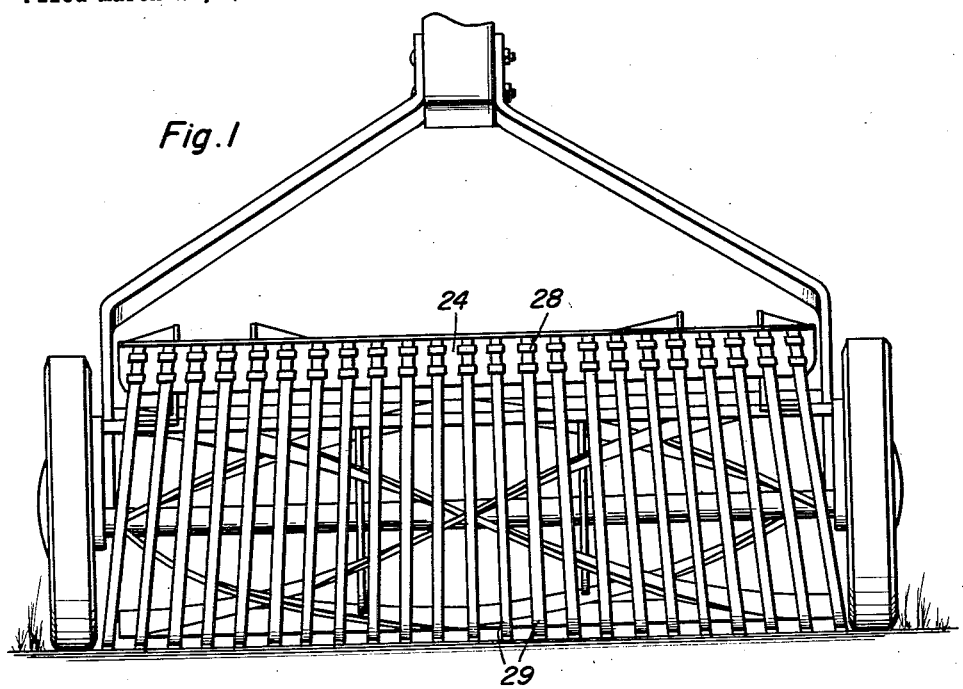
Figure 1 is a front elevational view.
Figure 2:
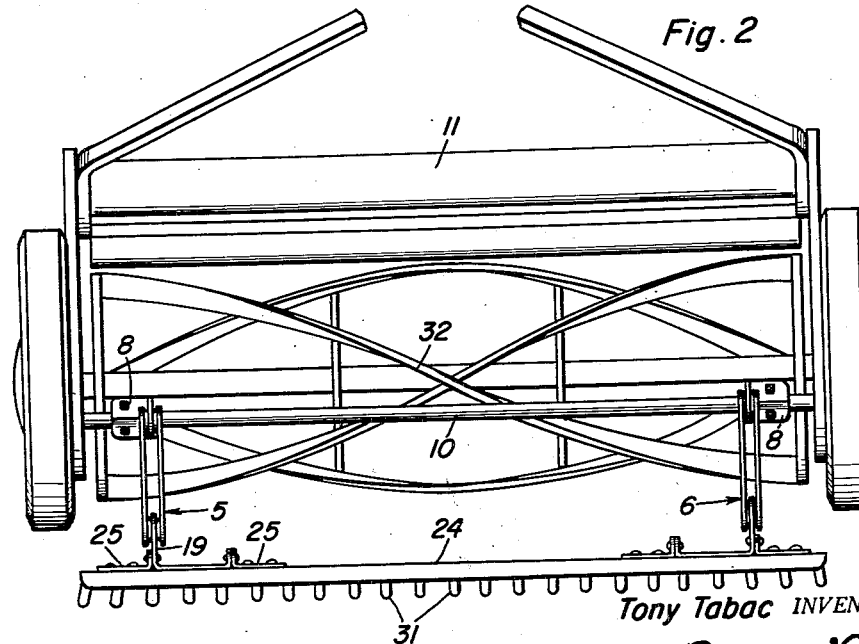
Figure 2 is a top plan view.

Referring now to the drawings in detail, wherein for the purpose of illustration, I have disclosed a preferred embodiment of my invention, the numerals 5 and 6 designate a pair of attaching brackets of duplicate construction and each including a clamping plate 7 of angle construction to provide a horizontal flange 8 having a groove 9 at its underside for clamping a frame rod 10 therein of a lawn mower 11 by means of a U-bolt 12. A vertical flange 13 extends upwardly at one end of flange 8 and to which a pair of spaced apart parallel link members 14 and 15 are pivotally secured by a rivet or the like 16 for vertical swinging movement of the links. The links are secured in swingably adjusted position by a cotter pin 17 positioned transversely in the links and selectively engaged in an arcuate row of openings 18 in the flange 13. The flange is formed with double rows of openings positioned forwardly and rearwardly respectively of the pivot 16 to enable interchangeable use of the angle brackets 7 as rights and lefts on the mower.

Links 14 and 15 extend forwardly with respect to the mower and a vertically swingable front bracket member 19 is pivoted to the front ends of the links by a rivet 20. The front bracket member 19 is also secured in swingably adjusted position by a cotter pin 21 secured to the links and selectively engaged in front and rear arcuate rows of openings 22 and 22a in the front bracket member. The front end of bracket member 19 is formed with a right angle flange 23 to which a rake header bar 24 is secured by bolts and nuts 26 and angle brackets 25 also secure the bracket member 19 to the header bar. The header bar 24 is formed with metal loops 28 in which the upper portions of tines 29 are frictionally or otherwise suitably secured. The tines are preferably constructed of strap metal and are formed with forwardly curved lower end portions 31.

Attaching brackets 5 and 6 are secured to the rod 10 of a lawn mower to support the rake 24 in front of the rotary cutting reel 32 of the mower. The tines 29 are secured at a desired vertically adjusted position by swinging the links 14 and 15 of the bracket members 19 upwardly or downwardly and securing the same in their adjusted position by the cotter pins 17 and 21. When the mower is pushed forwardly, the rake will remove sticks or trash from the path of the cutting reel and the forwardly curved lower ends 31 of the tines will lift vines or flattened grass for effectively cutting the same.

When the rake is not needed, the rake and the bracket members 19 may be raised on the pivots 20 into an upwardly inclined position above the mower, as shown by dotted lines in Figure 4 and locked in their raised position by the cotter pin 21.

What is claimed as new is as follows:

1. A rake for lawn mowers comprising a pair of attaching brackets adapted for attaching to a frame rod of a mower above the cutting reel thereof, said brackets including vertically swingable links, means securing the links to the brackets in a frowardly extending swingable adjusted position, vertically swingable bracket members pivotally attached to the front ends of the links, said links and said last named bracket members having registering arcuate openings, a pin selectively engaged in said openings to lock the last named bracket members in swingably adjusted position, and a rake secured to said last named bracket members.

2. A rake for lawn mowers comprising a pair of attaching brackets adapted for attaching to a frame rod of a mower above the cutting reel thereof, said brackets including vertically swingable links, means securing the links in a forwardly extending, swingably adjusted position, vertically swingable bracket members pivoted to the front ends of the links, a rake secured to the bracket members and swingable vertically therewith into either a downward active position in front of the reel or into an upward inactive position above the reel, and means securing the second named bracket members in adjusted vertically swingable position on the links to support the rake at a selected angle with respect to the mower, said first and second named brackets being formed with arcuately arranged openings and a pin carried at each end of the links and selectively engaged in said openings to lock the links in adjusted vertically swingable position and to independently lock the second named brackets in adjusted vertically swingable position.

References Cited in the file of this patent

UNITED STATES PATENTS

| 2,021,821 | Wescott | Nov. 19, 1935 |
| 2,157,620 | McGrath et al. | May 9, 1939 |
| 2,304,873 | Bangert | Dec. 15, 1942 |